United States Patent [19]

Schrenk et al.

[11] 3,759,647

[45] Sept. 18, 1973

[54] APPARATUS FOR THE PREPARATION OF MULTILAYER PLASTIC ARTICLES

[75] Inventors: Walter J. Schrenk, Bay City; Douglas S. Chisholm; Kenneth J. Cleereman; Turner Alfrey, Jr., all of Midland, Mich.

[73] Assignee: The Dow Chemical Company, Midland, Mich.

[22] Filed: Mar. 15, 1972

[21] Appl. No.: 234,978

Related U.S. Application Data

[60] Continuation of Ser. No. 88,385, Nov. 10, 1970, abandoned, which is a division of Ser. No. 835,839, April 10, 1969, Pat. No. 3,565,985, which is a division of Ser. No. 445,851, March 29, 1965, abandoned, which is a continuation-in-part of Ser. No. 431,336, Feb. 9, 1965, abandoned.

[52] U.S. Cl.................. 425/131, 425/133, 425/462, 264/171

[51] Int. Cl............................................. B29d 9/00

[58] Field of Search................... 425/131, 133, 381, 425/462; 264/171, 173; 18/33 RR; 259/4

[56] References Cited

UNITED STATES PATENTS

| 2,779,970 | 2/1957 | Stocker | 425/133 |
|---|---|---|---|
| 3,221,372 | 12/1965 | Lieberman | 425/467 |
| 3,239,197 | 3/1966 | Tollar | 259/4 |
| 3,485,912 | 12/1969 | Schrenk et al. | 264/171 |
| 3,487,505 | 1/1970 | Chisholm et al. | 425/131 |

Primary Examiner—R. Spencer Annear
Attorney—Griswold & Burdick

[57] ABSTRACT

Multiple layer films are made by arranging a minimum of two streams into one stream having a plurality of generally parallel layers. By mechanically manipulating the layered stream, an increased number of layers are obtained and the manipulating stream is shaped into a desired configuration having a plurality of layers generally adjacent to a major surface thereof. Under certain conditions, iridescent products are obtained without the use of pigment.

8 Claims, 18 Drawing Figures

INVENTORS.
Walter J. Schrenk
Douglas S. Chisholm
Kenneth J. Cleereman
Turner Alfrey, Jr.

BY

Robert B. Ingraham
AGENT

INVENTORS.
Walter J. Schrenk
Douglas S. Chisholm
Kenneth J. Cleereman
Turner Alfrey, Jr.
BY
Robert B. Ingraham
AGENT

APPARATUS FOR THE PREPARATION OF MULTILAYER PLASTIC ARTICLES

This application is a continuing application of our co-pending application Ser. No. 88,385, filed Nov. 10, 1970, now abandoned which in turn is a divisional application of our co-pending application Ser. No. 835,839, filed Apr. 10, 1969, now U.S. Pat. 3,565,985, which in turn was a divisional application of our earlier filed application Ser. No. 445,851, filed Mar. 29, 1965, now abandoned, which in turn was a continuation-in-part of our prior application Ser. No. 431,336, filed Feb. 9, 1965, also now abandoned.

This invention relates to the preparation of plastic articles, and more particularly relates to apparatus for the production of multilayer articles.

Oftentimes it is desirable to prepare synthetic resinous film and sheet wherein a plurality of components are arranged in laminar fashion to provide desired characteristics. Many methods and techniques have been used including the preparation of individual films or sheets and lamination by means of adhesives or by utilizing one of the layers as a melt adhesive. In general, such techniques are generally time consuming and expensive and do not offer the choice of varying thickness of the various layers of the laminates without difficulty. For example: where various layers are prepared by means of adhering two or more sheets together, sheets must be obtained of the desired thickness and subsequently laminated. Some laminates are generated by the simultaneous extrusion of diverse plastic materials into a two, three, four or even five layer configuration. Such multiple film is prepared utilizing equipment which has about one feed port for each layer in the resultant film. To prepare film having a great number of layers, such as 100 or 1000 layers, the mechanical problems and expense are usually considered prohibitive.

It is an object of this invention to provide an apparatus for the manufacture of multilayer composite thermoplastic resinous film employing equipment having a number of feed ports substantially less than the number of layers in the resultant film.

Another object of the invention is to provide an inexpensive apparatus for the production of such iridescent film.

The apparatus of the present invention operates by providing a composite stream of thermoplastic resinous material comprising at least two diverse thermoplastic resinous materials in heat plastified form, deforming the stream to provide a second stream of heat plastified thermoplastic resinous material containing a plurality of layers of diverse thermoplastic resinous material in heat plastified form, forming the stream into a desired configuration having at least one major surface wherein the layers of the stream lie generally parallel to the major surface thereof.

The apparatus of the present invention is an apparatus for the preparation of a composite article comprising means to provide at least two streams of heat plastified thermoplastic resinous material, means to mechanically arrange the two streams into one stream having a plurality of generally parallel layers, means to mechanically manipulate the stream to provide an increased number of layers, and means to shape the stream into a desired configuration having a plurality of layers generally parallel to a major surface of the desired configuration.

Further features and advantages of the invention will become more apparent from the following specification when taken in connection with the drawing wherein.

Figure 1:
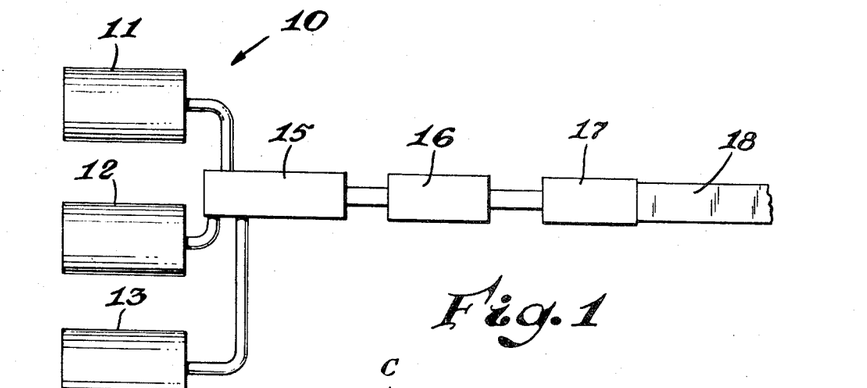
FIG. 1 is a schematic representation of the apparatus of the invention.

In FIG. 1 there is schematically depicted a basic apparatus in accordance with the invention generally designated by the reference numeral 10. The apparatus 10 comprises in cooperative combination a first source of heat plastified thermoplastic resinous material 11, a second source of heat plastified thermoplastic resinous material 12, and optionally, a third source of heat plastified thermoplastic resinous material 13, a combining means 15 adapted to receive heat plastified material from the sources 11, 12 and 13 and arrange them in adjacent layered relationship in a stream, a layer multiplying means 16 in communication with the combining means 15 wherein the stream of heat plastified thermoplastic material is physically rearranged to provide at least an apparent increase in the number of layers, a shaping die 17 is adapted to receive the stream from the layer multiplying means 16 so constructed and arranged so as to permit substantially streamline flow and to shape the stream to a desired configuration. The reference numeral 18 indicates a layered product prepared by the apparatus 10.

Figures 2, 4, 11:
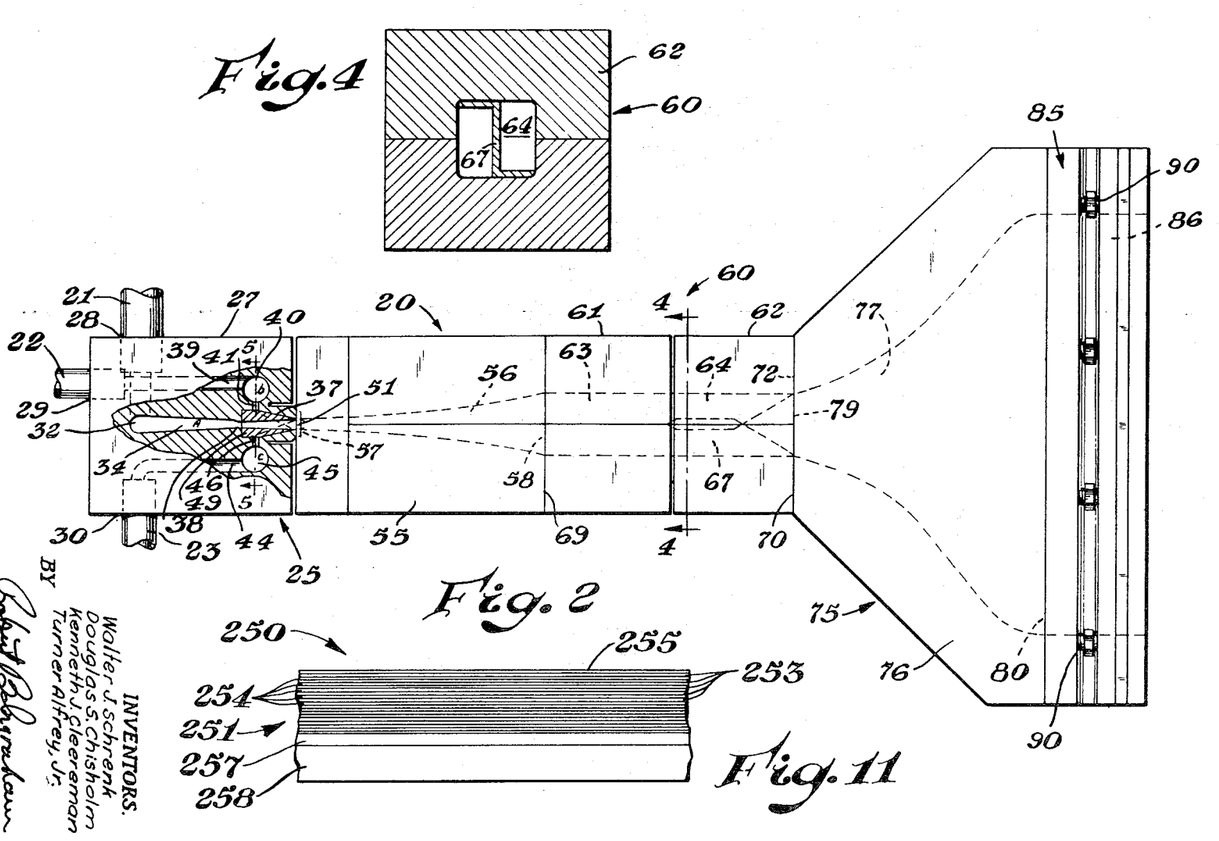
FIG. 2 is a partially cutaway view of one embodiment of an apparatus in accordance with the invention.
FIG. 4 is a cross-section of the apparatus of FIG. 2 taken along the line 4—4.
FIG. 11 depicts a partial end view of a multilayer iridescent film prepared by the apparatus of the invention.
Figures 3, 5:
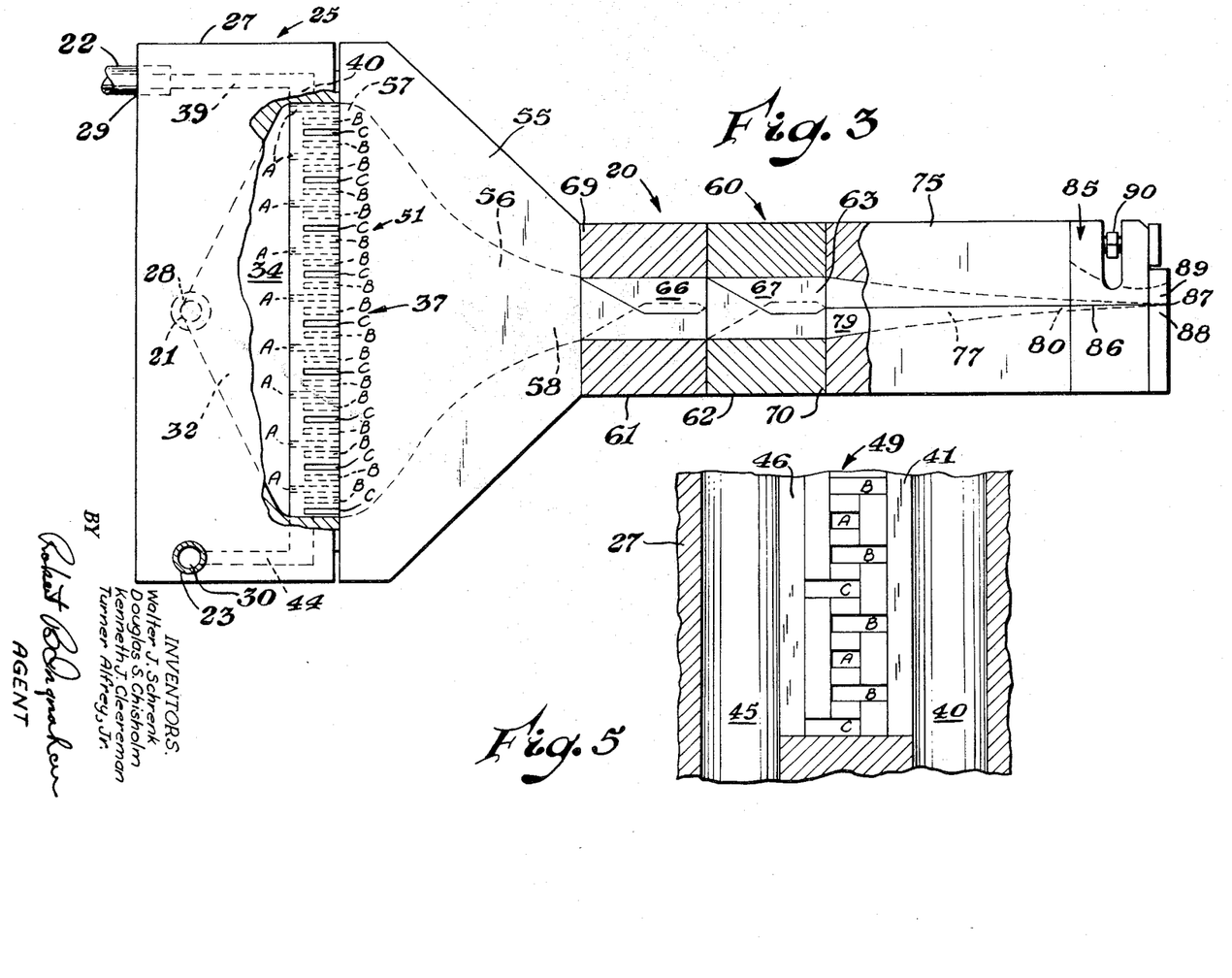
FIG. 3 is a partially cutaway elevational view of the apparatus of FIG. 2.
FIG. 5 is a fragmentary sectional view of the feed block or port arrangement of the apparatus of FIGS. 2 and 3.

FIGS. 2–4 depict partially cutaway views of one embodiment of the invention generally designated by the reference numeral 20. The apparatus 20 comprises in cooperative combination a first heat plastified thermoplastic resinous source 21, a second heat plastified thermoplastic resinous source 22, and a third heat plastified thermoplastic resinous source 23, the sources 21, 22 and 23 are in operative communication with a distributing or layering means generally designated by the reference numeral 25. The distribution means 25 comprises a housing 27. The housing 27 defines a first polymer inlet 28 in operative cooperation with the first source 21, a second polymer inlet 29 in operative combination with the second source 22, and a third inlet 30 in combination with the third source 23. The inlet 28 is in full communication with an internally disposed passageway 32 terminating remote from the inlet 28 in a plenum or chamber 34. The housing 27 defines an internally disposed layering chamber 37 which is in communication with the chamber 34 by means of the passage 38. The second passageway 29 is in communication with a passageway 39 which terminates in a distribution plenum 40. The plenum 40 in turn is in communication with the layering chamber 37 by means of the passageway 41. The inlet 30 is in full communication with the third passageway 44 which in turn terminates at a distribution plenum 45. The distribution plenum 45 communicates with the layering or distribution chamber 37 by means of the passageway 46. A layering or feed block 49 is disposed within the chamber 37. The layering block 49 has defined therein a plurality of orifices indicated by the letters A, B and C which are so constructed and arranged so that the passageways designated by A communicate with the chamber 34, the passageways designated by B communicate with the distribution plenum 40, and those designated as C communicate with the distribution plenum 45.

FIG. 5 depicts a view of the layering block 49 illustrating the channels A, B and C when the housing 27 only is sectioned along the line 5—5 of FIG. 2. The layering chamber 37 terminates in a generally rectangular orifice 51 remote from the passageways 38, 41 and 46. Disposed adjacent the housing 27 is a stream shaping housing or transition piece 55. The transition piece 55 defines an internal passageway 56 having a first end 57 and a second end 58. The first end 57 of the passageway 56 has a cross-sectional configuration substantially equivalent to that of the orifice or slot 51. The end of the housing 55 has disposed therein the passageway end 57 which is in sealing engagement with the housing 27. The cross-sectional configuration of the passageway 56 varies from an elongated slot at the first end 57 to a substantially spaced rectangular configuration at the second end 58. Beneficially, the cross-sectional configuration of the passageway 56 has a constant cross-sectional area. A layer multiplying means 60 is disposed adjacent the transition piece 55. The layer multiplying means 60 comprises a first housing 61 and a second housing 62. The housing 61 defines a generally rectangular internal passageway 63. The housing 62 defines an internal passageway 64 of generally rectangular cross-section. The housing 61 is in sealing engagement with the housing 55 adjacent the second end 58 of the passageway 56 in such a manner that the passageway 63 is in full communication with the second end 58 of the passageway 56. The housing 62 is in sealing engagement with the housing 61 in such a manner that the passageways 63 and 64 are substantially coaxial. A stream dividing and recombining means which increases the number of layers in a stream is disposed within a passageway 63, and a similar dividing and recombining means 67 is disposed within the passageway 64. The operation of such dividing and recombining means are set forth in U.S. Pat. No. 3,051,453, and need not be repeated herein. FIG. 4 is a sectional view taken along the line 4—4 of FIG. 2. The multiplying section 60 has a first end 69 and a second or terminal end 70 having an inlet opening 71 and an outlet opening 72. A stream shaping section or transition piece 75 is disposed adjacent the second end 70 of the stream shaping portion 60. The transition piece 75 comprises a housing 76 having defined therein an internal passageway 77. The housing 76 is in sealing engagement with the second end 70 of the housing 60. The passageway 77 has a first opening 79 substantially commensurate in cross-section with the cross-section of the opening 72. The passageway 77 terminates in a second end or opening 80 having a generally slot-like configuration. Beneficially, the cross-sectional configuration of the passageway 77 is maintained at a constant cross-sectional area from the essentially square configuration 79 to the elongated slot-like configuration 80. A sheet or sheeting die 85 is disposed in sealing relationship with the second end 80 of the passageway 77 of the housing or transition piece 75. The sheeting die 85 defines an internal passageway 86 which communicates with the second end 80 of the passageway 77 and terminates remote therefrom in the extrusion orifice 87 defined by the fixed die lip 88 and an adjustable die lip 89. Positioning of the adjustable die lip 89 is accomplished by means of screws 90.

In operation of the embodiment of the present invention depicted in FIGS. 2–5, heat plastified thermoplastic resinous material is supplied to the chambers 34, 40 and 44. From the chamber 44 the polymer A is extruded as a plurality of strips from the apertures designated as A. A plurality of thin strips of the polymer B emerge from the slots or apertures indicated by the letters B and polymer C is extruded from the slots or apertures indicated as C. Thus, the sequence of layers or strips is ABC ABC ABC ABC . . . entering the opening 51 of the transition piece 55. The stream at the entrance 51 of the transition piece 55 comprises a plurality of heat plastified thermoplastic resinous streams in edge to edge relationship wherein the materials extend from one major surface of the stream to the opposite. As this layered stream passes through the passageway 56 of the transition piece 55, the width of the sheet is decreased and the thickness increased until the stream acquires an essentially square cross-section at the exit 58. The stream portions maintain their relative location to one another and no rotation of the flow lamina occurs. On passing through the stream multiplying section 60, the stream is divided and recombined to provide a stream entering the passageway 77 of the transition piece 75 having about 4 times the number of layers than entered the stream multiplying section. The transition piece 75 reshapes the essentially square stream emerging from the stream multiplying section 60 to expand the stream in a direction parallel to the major surfaces of the layers in the stream, and the stream is finally extruded through the sheeting die 85 as a thin sheet or film. Thus, in the particular embodiment illustrated the number of layers in the extruded film is about 4 times the number of feed ports employed. The number of layers is readily increased by increasing the number of stream multiplying sections such as 61 and 62.

Figure 6:
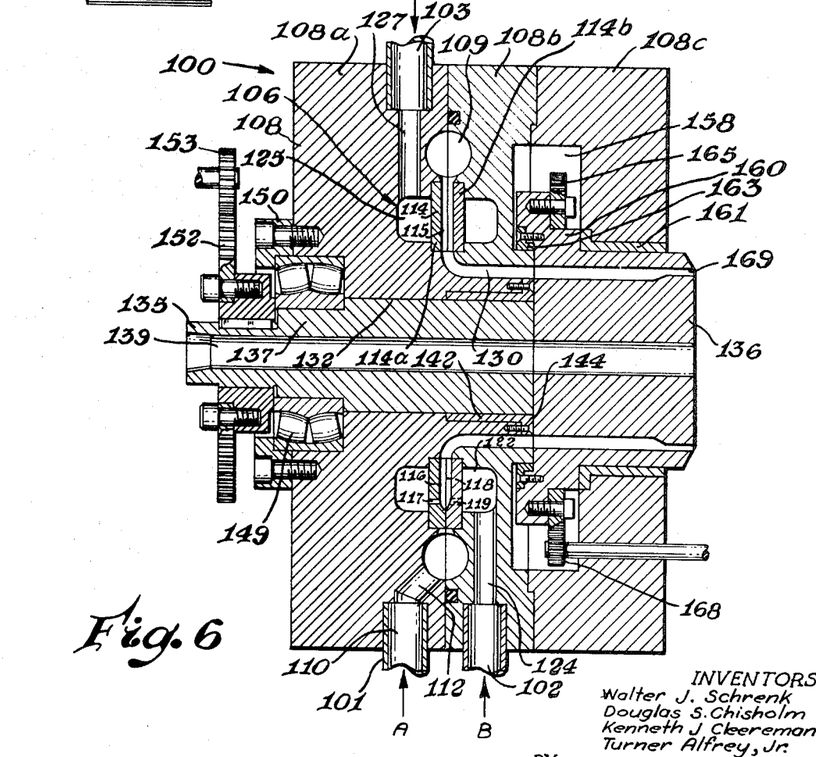
FIG. 6 is an alternate embodiment of the invention employing a rotary die.
Figure 6A:
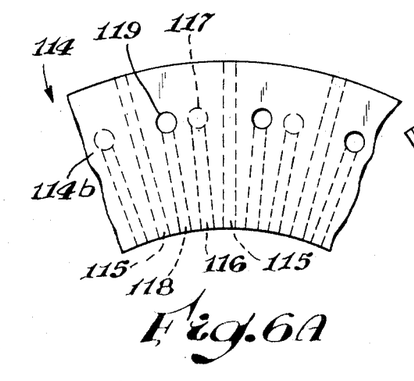
FIGS. 6A, 6B and 6C are fragmentary views of a feed port block or distribution manifold or manifolds suitable for use in the apparatus of FIG. 6.

In FIG. 6 there is illustrated an alternate embodiment of the invention designated by the reference numeral 100. The apparatus 100 comprises in cooperative combination a first polymer source 101 also indicated as supplying stream A, a second polymer source 102 indicated as supplying stream B and a third polymer source 103 indicated as supplying stream C. The polymer or sources 101, 102 and 103 are in cooperative combination with a polymer distributing section generally indicated by the reference numeral 106. The polymer distributing section 106 is defined by a housing 108. The housing 108 is made up of housing sections 108a, 108b and 108c. The housing 108 defines a generally toroidal or annular cavity 109. Adjacent the polymer source 101 is an opening 110 in the housing 108. The opening 110 communicates with the generally toroidal chamber 109 by means of a passageway 112. Generally adjacent to the annular passageway or cavity 109 is a feed block 114 comprising a first portion 114a and a second portion 114b. The portions 114a and 114b are assembled in mating relationship to form a plurality of slots or passageways 115, generally radially extending entirely through the ring 114 and the outermost circumferential portion of the slots being in communication with the generally toroidal chamber 109. A second series of radially extending slots 116 are disposed within the distribution block 114. The slots 116 terminate in openings adjacent the inner open ends of the slots 115 and communicate with a side of the distribution block 114 by means of a plurality of passageways 117 in the ring portion 114a. Also inter-spaced between the slots 115 and 116 are a plurality of slots 118 generally commensurate with the slots 116, but communicating with the outer phase of the ring portion 114b by means of the passageways 119. The configuration of the slots is made clear in fragmentary view FIG. 6A taken along the line A—A of FIG. 6 wherein the relationship of these slots is illustrated more clearly. The distributor block 114 in combination with the housing 108 defines a second annular chamber or passageway 122 which is in communication with the passageways 119 formed in the distributor block half 114b. A passageway 124 provides communication between the polymer source 102 and the annular passageway 122. A third annular passageway 125 is defined in the housing 108 and by the distributor block 114. The chamber 125 is in communication with the polymer source 103 by means of the passageway 127. A generally annular passageway 130 is formed within the housing 108 and communicates with the portions of the slots or passsageways 115, 116 and 118 remote from the annular passageways 109, 122 and 125. The passageway 130 smoothly curves into a generally annular configuration to permit streamline flow of fluid within the passageway. The housing portion 108a defines a generally cylindrical centrally disposed cavity 132. The cavity 132 is substantially coaxial with the passageway 130. Rotatably supported within the passageway 132 is a mandrel generally designated by the reference numeral 135. The mandrel 135 comprises a die portion 136 and a body portion 137. A central passageway 139 is defined within the mandrel 135 providing substantially end to end communication therein. A bearing 142 is disposed within the housing portion 108a and engages the body portion 137 and a shoulder 144 formed on the die portion 136. A second bearing 149 is disposed partially within the housing 108 and carries the body portion 137. The bearing 149 is maintained in position by the retainer 150. A gear or rotating means 152 is secured to the body portion of the mandrel 137 and is in engagement with a power source such as the pinion 153. The housing portions 108b and 108c define an internal annular die receiving cavity 158. The cavity 158 is coaxially arranged with the passageway 130 and the mandrel 135. Rotatably positioned within the cavity 158 is an external die member 160. The die member 160 is supported within the cavity 158 by means of the bearing member 161 and the integrity of the annular passageway 130 is maintained by means of the seal 163, secured to the die member 160 and in sealing rotatable engagement with the housing portion 108b. A ring gear 165 is rigidly affixed to the die member 160 and is rotated by the power source or pinion 168 rotatably mounted in the housing portion 108c. The die member 160 in cooperation with the die portion 136 forms the annular extrusion orifice 169. In operation of the embodiment of the invention illustrated in FIGS. 6 and 6A, thermoplastic materials or polymers follow the paths indicated by the arrows; that is, polymer A enters the passageway 112, flows in and about the annular chamber 109 through the passages 115 and into the annular orifice 130. Polymer B from the source 102 flows through the passage 124 into the annular chamber 122 through the passages 119 into the radially extending slots 118 and into the annular passageway 130. Polymer C from the source 103 flows through the passageway 127 into the annular chamber 125 and from the chamber 125 into the radially disposed slots 116 and into the annular passageway 130. Employing the feed port arrangement as illustrated in FIG. 6A the stream flowing in the annular passageway 130 adjacent the feed port; i.e., in the stationary portion of the passageways, comprises a plurality of radially extending layers composed of polymers ABC, ABC, ABC. On entering the portion of the annular passageway 130 defined by the die portion 136 of the mandrel 135 and the external die portion 160, the various radially extending layers are transformed into spirally disposed layers when a difference in rotational speed exists between the mandrel 135 and the external die portion 160. Advantageously, the external die portion 160 and the mandrel 135 are rotated in opposite directions in order to achieve a maximum spiral for a minimal residence time within the annular passageway 130. The product discharged at the extrusion orifice 169 comprises a multi-layer tube having a plurality of spirally disposed components extending from the inner surface to the outer surface, the spiral configuration being determined by the linear rate of travel of material through the rotating portion of the passageway 130 and the rates of rotation of the external die portion 160 and the mandrel 135.

Figure 6B:
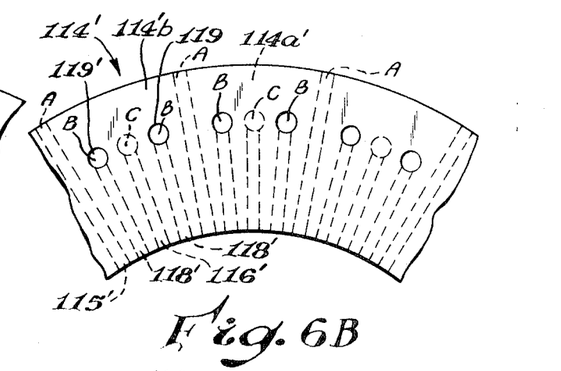

In FIG. 6B there is illustrated an alternative arrangement of a feed or distribution block 114' comprising a first half 114'a and 114'b, radially extending slots 115' being spaced between radially extending slots 118' and passages 119'. Disposed between adjacent slots 118' alternately are the slots 115' and the slots 116' and passageways 117'. The letters A, B and C in FIG. 6B indicate the polymer material which would enter and leave the particular slots if the distribution block of FIG. 6B replaces the distribution block 114 of FIGS. 6 and 6A. Thus, employing the embodiment set forth in FIG. 6B, the resultant tube would have spirally arranged layers of the sequence . . . ABCB ABCB ABCB . . . This embodiment is particularly advantageous where the B layer either promotes or prevents adhesion of the A and C layers, whichever phenomenon is desired.

Figures 6C, 6D, 6E, 6F:
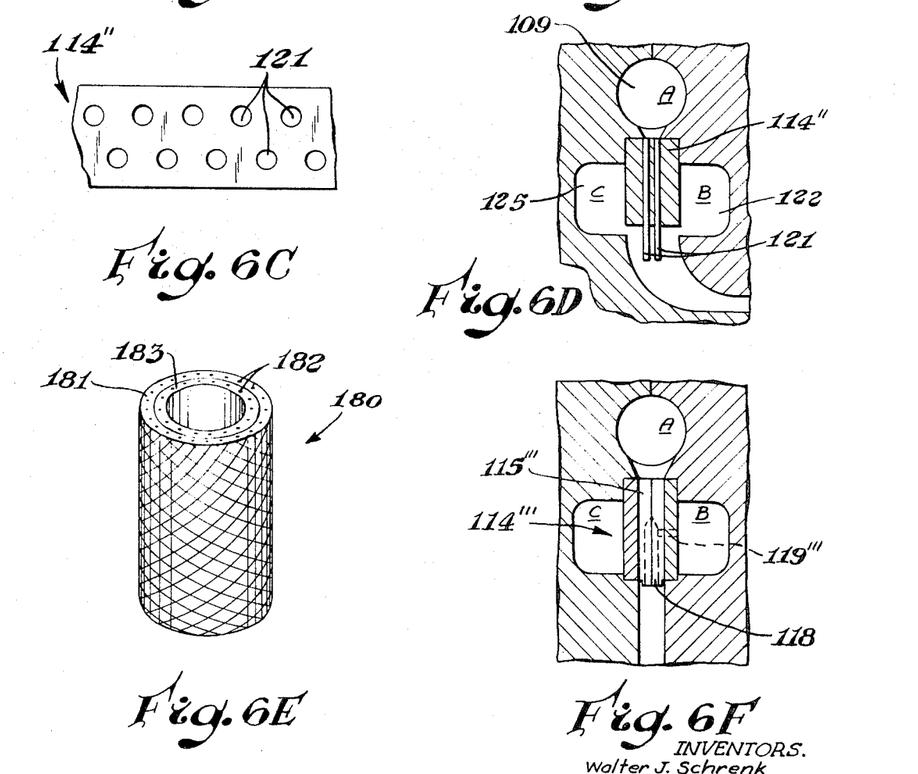
FIG. 6D is a sectional view of an alternate embodiment of the invention wherein a plurality of filaments are encapsulated within a plastic body.
FIG. 6E is a representation of a product prepared employing the feed port arrangement of FIG. 6D.
FIG. 6F depicts an alternate feed port arrangement to be utilized with the embodiment of FIG. 6.

In FIG. 6C there is illustrated an alternative arrangement of a distribution ring 114". The view in FIG. 6C is taken radially outwardly from the center. The distribution block 114" has disposed therein a plurality of radially disposed hollow tubes 121.

FIG. 6D depicts a sectional view of the ring 114''' and its relationship to the annular passageways within the housing wherein polymer A is passed through the tubes 121 and the chamber 122 is provided with polymer B and the chamber 125 is provided with polymer C.

The resultant product designated by the reference numeral 180 is schematically illustrated in FIG. 6E. The product 180 comprises a tube having an outer layer 181 composed of polymer B containing helically oriented filaments 182 of polymer A and an inner layer 183 of polymer C containing helically oriented filaments of polymer A. This configuration is achieved when the die portion 160 and the mandrel 135 are rotated in opposite directions.

FIG. 6F depicts an alternate cross-section of a distribution block 114''' wherein radially extending passageways 115''' are commensurate with the width of the annular slot 130 and slots 118''' are substantially narrower. Such an arrangement results in the encapsulation of a polymer B entering the passageway 119''' and being discharged from the slot 118'''.

Figure 7:
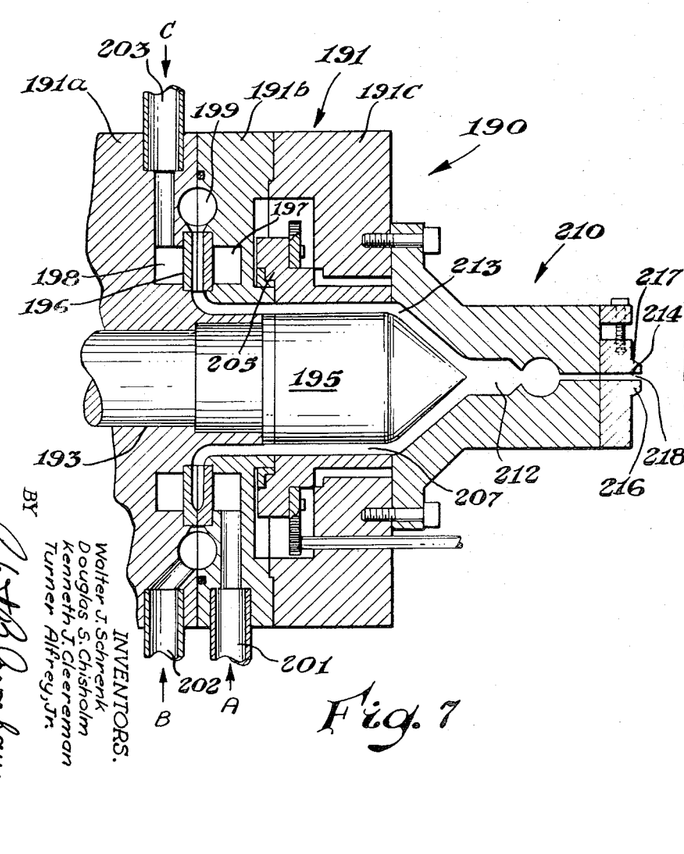
FIGS. 7 and 8 are two views of an alternate embodiment of the invention.

In FIG. 7 there is illustrated a modification of the apparatus of FIG. 6 generally depicted by the reference numeral 190. The apparatus 190 comprises in cooperative combination a housing generally designated by the reference numeral 191. The housing 191 comprises 3 housing portions 191a, 191b and 191c disposed in sealing relationship with each other. The housing 191 defines an internal cavity generally designated by the reference numeral 193 within which is disposed a rotatable mandrel 195. Disposed within the housing 191 is a distribution block 196 identical to the distribution block 114 of FIG. 6. Cavities 197, 198 and 199 adapted to receive polymers A, B and c, respectively, form polymer sources 201, 202 and 203. The distribution block 196 discharges polymeric layers into a generally annular passageway 199 in a manner identical to that of the block 114 of FIG. 6. Within the housing portions 191b and 191c is mounted a rotatable die portion 205 which, in cooperative combination with the mandrel 195, defines the annular passageway 207. A sheeting die generally designated by the reference numeral 210 is in sealing engagement with the housing portion 191c and adapted to receive polymeric material from the passageway 199. The housing 210 defines an internal passageway 212 having a receiving end 213 and a discharge end 214. The mandrel 195 in cooperation with the sheeting die 210 forms the receiving passageway end 213 into a hollow conical configuration permitting streamline flow. The terminal portion of the sheeting die 210 comprises a fixed die lip 216 and an adjustable die lip 217. The die lips 216 and 217 define an extrusion orifice 218.

Figure 8:
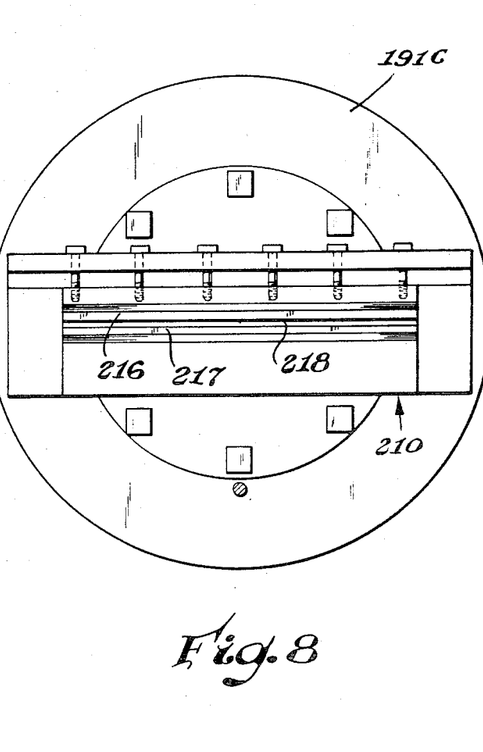

FIG. 8 depicts a front view of the apparatus of FIG. 7 indicating the relationship between the housing 191 and the sheeting die 210.

Figure 8A:
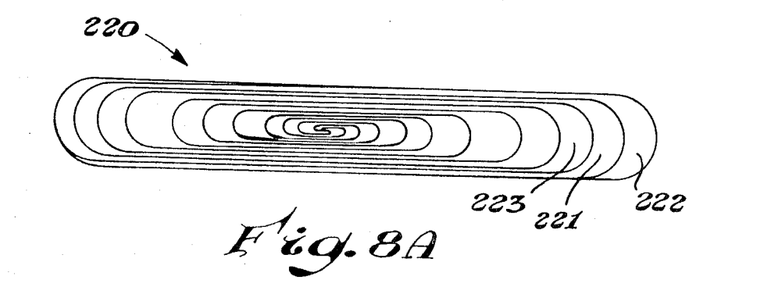
FIG. 8A schematically depicts the product obtained from the apparatus of FIGS. 7 and 8.

In FIG. 8A there is illustrated a schematic exaggerated cross-sectional view of a sheet produced by the apparatus of FIGS. 7 and 8. The sheet is designated by the reference numeral 220 and a plurality of layers of polymer 221, 222 and 223 in an elongated spiral configuration are depicted.

Figure 9:
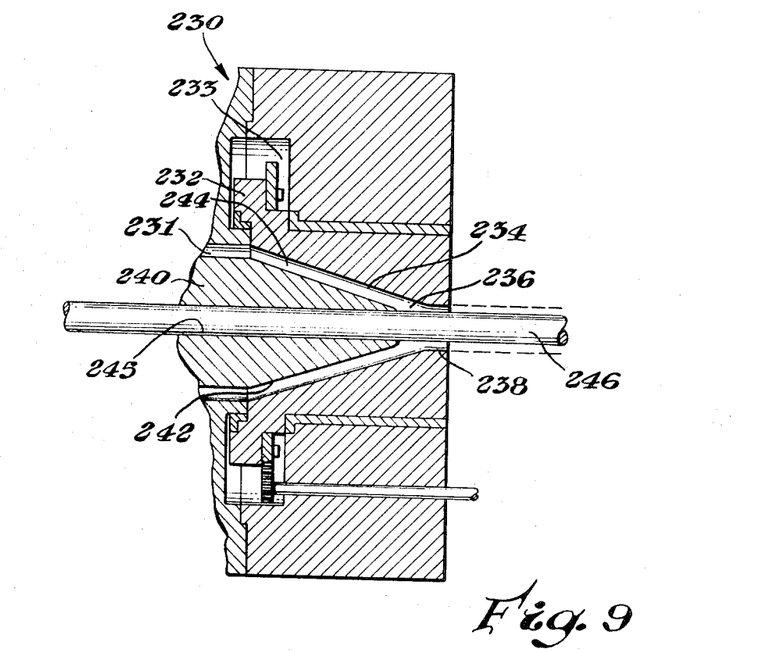
FIG. 9 is a sectional view of a modification of the apparatus of FIG. 6.

In FIG. 9 there is schematically depicted an alternate embodiment of the invention employing feed streams essentially as obtainable from FIG. 6 and the various feed ports of FIGS. 6B, C, D and E. The apparatus of FIG. 9 comprises a housing generally designated by the reference numeral 230 and defining therein a generally annular feed channel 231 adapted to receive a striated or foliated stream such as the embodiments of FIGS. 6B, C, D and E. A rotating external die 232 is disposed within a cavity 233 of the housing 230. The die 232 defines a tapering conical inner surface 234 which defines a passageway 236. The passageway 236 is in communication with the passage 231 and decreases in diameter as the distance is increased from the annular passage 231. The passageway 236 terminates at an external die lip 238 remotely disposed from the annular passageway 231. A rotating mandrel 240 is disposed within the passageway 236. The mandrel 240 defines a generally conical surface 242 disposed in spaced relationship to the surface 234 defining an annular generally conical space 244. An axially arranged passageway 245 is defined by the mandrel 240 and an elongated generally cylindrical object 246 such as a cable, conduit or the like is disposed within the passageway 245. In operation of the embodiment of FIG. 9, striated or layered feed stream from the passageway 231 passes through the generally conical passageway 244 wherein the striations or layers are spirally disposed. The material contacts the elongated object 246 which is withdrawn in the direction of the arrow, thereby providing a multilayer coating thereon. An alternate modification of the apparatus of FIG. 9 is to employ a solid mandrel and extrude a rod having spiral layers of laminations.

Figure 10:
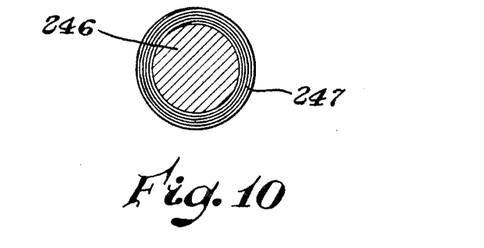
FIG. 10 is a schematic sectional view of a product obtained from the modification of FIG. 9.

FIG. 10 depicts a schematic simplified cross-sectional view of an elongated article such as the article 246 having a multilayer spirally laminated coating 247 on the external surface thereof.

In FIG. 11 a fractional end view of an iridescent structure prepared by the apparatus of the invention and generally designated by the reference numeral 250 is depicted. The structure 250 comprises an iridescent film generally designated by the reference numeral 251. The film 251 is comprised of a plurality of layers 253 of a transparent synthetic thermoplastic resinous material which lie between and adhered to a plurality of layers 254 of a transparent synthetic resinous material lying between and bonded to the layers 253. A transparent surface layer 255 is adhered to an adjacent layer 253. The refractive indices of the thermoplastic resinous materials comprising layers 253 and 254 differ by at least about 0.03. A pressure sensitive adhesive layer 257 is disposed in contact with the film 251 remote from the surface 255. The pressure sensitive adhesive layer secures the film to a substrate 258.

In operation of the apparatus of the present invention, streams of diverse thermoplastic resinous materials are provided from suitable sources, such as, for example, the heat plastifying extruder. The streams are then passed to a mechanical manipulating section which serves to rearrange the original streams into a multilayer stream having the number of layers desired in the final product and subsequently the multilayer stream is passed into an extrusion die which is so constructed and arranged that streamline flow is maintained therein and the resultant product is extruded with the laminae substantially parallel to the major surfaces thereof. Any suitable source of heat plastified thermoplastic material may be utilized, including extruders, heat plastifying injection machines and any number of diverse thermoplastic materials may be incorporated into such a film.

The operation of the apparatus of the invention will be described, for the sake of simplicity, with reference to apparatus designed primarily to receive two streams. However, streams in excess of two are also readily employed. A number of diverse stream arranging devices may be employed to increase the number of layers in the original combined stream to that desired in the final product. Such devices are well known to the art and one such device and method are described in U.S. Pat. No. 3,051,452.

The apparatus shown in U.S. Pat. No. 3,051,452 employs an annular stream diverter which divides and recombines a flowing stream in such a manner that a large number of layers are generated. Such a large number of layers are generated that the material becomes an apparently homogeneous mixture. A device embodying the same principle as described in U.S. Pat. No. 3,051,453, but is so constructed that rather than generating a plurality of concentric layers a number of parallel laminae are produced. U.S. Pat. No. 3,131,910 describes a mixing apparatus which provides a number of spirally disposed layers within a stream. A mixer operating on a similar principle is disclosed in U.S. Pat. No. 3,127,152; i.e., preparation of vanishingly thin layers. Another apparatus which is useful to generate layers for the practice of the present invention is shown in U.S. Application Ser. No. 218,782 for COUNTER ROTATING DISC MIXER, filed Aug. 22, 1962, now U.S. Pat. No. 3,176,965. A relatively thorough discussion and theoretical analysis of mixers utilizing rotation of a conduit relative to a stream flowing therethrough and of fluids in an annular channel are set forth in the American Society of Mechanical Engineers, Publication No. 62-WA-336, "Continuous Mixing of Very Viscous Fluids in an Annular Channel", by W. J. Schrenk, K. J. Cleereman and T. Alfrey, Jr., and Publication No. 63-WA-303, "Mixing of Viscous Fluids Flowing Through a Rotating Tube", by W. J. Schrenk, D.S. Chisholm and T. Alfrey, Jr. The methods and devices of the foregoing references are all directed toward the preparation of homogeneous mixtures by providing a plurality of layers and decreasing the thickness of the layers to the vanishing point. In operation of the apparatus of the present invention, such devices are used to generate layers of a desired and predetermined thickness and not to produce a homogeneous or a substantially homogeneous mixture. For example: the flow diverters of U.S. Pat. No. 3,051,452 and U.S. Pat. No. 3,051,453 are readily employed in sufficient numbers to produce the desired number of layers, whereas the rotating mixers described in U.S. Pat. Nos. 3,127,152 and 3,131,910 and the American Society of Mechanical Engineers Publications are rotated only at a sufficient rate to generate the desired number of layers. If such mechanical working sections are employed to produce a homogeneous mixture of the diverse streams, the benefits and advantages of the present invention are entirely lost. The layered heat plastified thermoplastic resinous stream emerging from the mechanical arranging section may then be fed to an extrusion die which permits the flow of the material therethrough in a streamline manner. Thus, the configuration of the extrusion die may be such as to reduce the thickness and dimension of the layer into the desired region of from about 50 to 10,000 Angstroms. The precise degree of reduction in thickness of the layers delivered from the mechanical orienting section, the configuration of the die, the amount of mechanical working of the film after extrusion, are all inter-related factors which will determine the thickness of the layers in the product. Such factors are readily calculable once the constants for any particular portion of the apparatus are known, as described in the ASME publications. Thus, any of the mechanical orienting sections are readily utilized with tubing dies or sheeting dies. The section or baffle of U.S. Pat. No. 3,051,452 is particularly adapted to provide a tube having a plurality of concentric layers. The baffle of U.S. Pat. No. 3,051,453 is particularly suited for combination with a sheeting die or slot die wherein the layers are extruded parallel to the slot, resulting in a sheet having laminations parallel to the major surfaces. This section may also be employed with a tubing die and a major portion of the wall of the tube will have a number of laminations equal to about one half the number of layers in the stream. The rotary type mixers of U.S. Pat. Nos. 3,127,152 and 3,131,910 are particularly suited for use with tubing dies wherein a plurality of laminae are spirally arranged. It is necessary that streamline flow be maintained in the apparatus in order that the individual laminae maintain their integrity. Turbulence results in mixing and severe disruption of the laminae and the desired optical characteristics of the product are not obtained. When a tubing die is employed to receive a stream, most advantageously the mandrel of the tubing die is supported in such a manner that a minimum number of spider arms are employed and beneficially, the mandrel may be an integral part of the mechanical orientations section in order that no seal or weld lines are generated in the film or the laminae, or no disruption or displacement of the lamine occurs.

By employing the various modifications of the basic principle of essentially producing a striped sheet; that is, a sheet comprising diverse thermoplastic resinous bodies, in laterally discontinuous relationship to each other, and subjecting the sheet (and including tubes which, for purposes of comprehension of the present invention, may be considered as sheets bent into a cylindrical configuration) to lateral deformation, a wide variety of multilayer products can be made with either a plurality of parallel lamina extending the entire width of the sheet such as is obtained by the embodiment of FIGS. 2 and 3, or sheets having spirally arranged laminae such as that of FIG. 8, encapsulated spirally arranged laminae when using the embodiment of FIG. 6F, or alternatively, the helical laminae which result from the feed port arrangement of FIG. 6D. The laminae produced from FIG. 6D are essentially spirally arranged and come from a viscous deformation of the originally extruded tube or rod-like configuration under the shear force of the rotating mandrel and/or die.

For the preparation of multilayer sheets having maximum geometrical symmetry of the layers, the embodiment of FIGS. 2 and 3 is particularly advantageous in that the degree of distortion from the initial rectangular pattern issuing from the feed ports is minimal and a sheet having generally parallel layers extending from one side to the other obtained. The layers in the film issuing from the die 85 are distorted only by minor deviations in flow pattern which arises from corner effects, skin effects and the like. Thus, the embodiment of FIGS. 2 and 3 is particularly useful for preparing iridescent film having a generally uniform pattern of iridescence over the surface thereof because of the fundamental geometric fidelity maintained by the linear and non-rotating flow patterns. Similarly, when uniform physical properties are desired, it is generally advantageous to utilize as symmetrical and uniform a distribution of the material within the various layers as is possible.

The embodiment of the invention depicted in FIGS. 6 and 6A-6F and FIGS. 7, 8 and 9 inherently produces a product which has a generally spiral configuration of the layers in a cross-section thereof. For example: the tube produced by the embodiment of FIG. 6 employing the feed port arrangement of FIG. 6A provides a striated feed into passages 130 wherein there are a plurality of thermoplastic resinous strips in edge to edge relationship extending from the inside to the outside of the passageway. Thus, the interfaces between the diverse plastic materials extend substantially radially as this tube with the radially disposed interfaces enters the area between the rotating die 163 and the rotating mandrel. The interfaces are elongated and disposed in a generally spiral pattern, while still maintaining their relative location at the interface. Thus, a spiral layer depending upon the relative speed of rotation of the mandrel and the die may thus in effect spiral outwardly from the inner surface in a spiral of a few or many turns, depending on the feed rate of the striated tube.

In order to obtain iridescent film having the maximum iridescent appearance and a maximum degree of clarity, it is desirable to encapsulate the individual streams of polymer within a polymer matrix in order that the external surface and internal surface of the polymer stream contacting the rotating surfaces of the die is composed of a homogeneous material and that the individual streams retain their identity. If such encapsulation is not done, the maximum iridescence is not achieved. For example: if the feed port arrangement as depicted in FIG. 6 is employed, there is a tendency toward opalescence or pearlescence at the inner surface of the resulting tube or in the center if the die arrangement of FIG. 7 is employed. Utilizing either the encapsulation or non-encapsulation arrangement of the feedports results in attractive and decorative film having excellent physical characteristics, but for maximum transparency and iridescence, encapsulation of feed streams within a matrix stream is desirable.

By utilizing apparatus in accordance with the present invention, it is possible to prepare thin film from thermoplastic resinous sheet having a large number of distinct and individual layers. When diverse transparent resinous materials are employed to prepare such a film and at least 20 percent of the number of the layers have a thickness ranging from about 0.05 micron to about 5 microns, attractive optical effects are observed and preferably from about 0.05 micron to about 1 micron results in an iridescent film having an extremely attractive and decorative appearance.

Employing the embodiment illustrated in FIG. 9 and omitting the conductor 246, a rod or filament is prepared having a spiral laminated configuration. Although the invention has been described utilizing a single opening die such as a sheeting die, a tubing die and the like, multiple filaments of unique and attractive appearance are prepared when the single opening dies are replaced with multiple opening dies or die plates having a plurality of extrusion orifices adapted to extrude parallel filaments. The multilayer stream is readily divided by a multiple orifice die plate to provide a plurality of strands which can be drawn and oriented in the conventional manner. However, in order to achieve iridescence, there must be at least two layers in the filament which have a thickness of from about 0.05 to about 5 microns, and preferably 0.05 to 1 micron for maximum iridescent effect, and have a difference in refractive index from the adjacent layer of at least 0.03 and preferably 0.1. Such multilayer iridescent filaments are readily processed into attractive fabrics or admixed with other fibers or filaments to provide attractive iridescent filaments.

Employing the apparatus of the present invention, a wide variety of structures may be produced. Particularly beneficial and advantageous are the iridescent films, coatings, rods and filaments which are prepared by employing diverse thermoplastic resinous materials in adjacent layers to provide the transparent body. Beneficially, the apparatus of the present invention also will prepare unique laminar structures of diverse thermoplastic resinous materials which are particularly useful in the packaging art. Multilayer film in accordance with the present invention, be it prepared from transparent or non-transparent materials, provides composite structures having generally improved physical properties including a significant increase in the resistance to delamination or adhesion between adjacent layers than is obtained when simple two or three layer laminates having like thicknesses are prepared. Beneficially, for example, a two or three layer laminate film is a substantially poorer gas barrier in practice than is a multilayer film having the same thickness and same proportion of components. A two or three layer film, on folding or wrinkling, oftentimes loses a relatively large part of its barrier properties, whereas the multilayer films in accordance with the present invention largely retain a major portion of their original barrier properties. Thus, in applications involving gas barrier overwraps, the multilayer films are found superior due to the increased gas barrier property and the increase in adhesion between adjacent layers.

Employing the minor modification of the apparatus of FIGS. 2–5 or the apparatus of FIG. 6, one can readily extrude an iridescent film on an opaque or dissimilar substrate. For example: when the feed arrangement of the apparatus of FIGS. 2–5 is arranged in such a way that one of the polymer sources is adapted to extrude polymer adjacent one of the terminal ends of the feed block 49, for example, by removing all of the passageways designated as present with the exception of the one adjacent the lower portion of FIG. 3, a diverse thermoplastic resinous material may be introduced which does not contribute toward the iridescent film itself, but serves as a substrate. For example: when a black polymer is extruded adjacent one end of the feed block, the resultant product is an iridescent film laminated to a black substrate. Such a film is extremely attractive due to the emphasis of the iridescent character on the dark background. The extrusion rate of the substrate is readily varied to provide a wide variation in the thickness, and further obvious modifications of the feed block may be made in order to increase the proportion of substrate. For example: one half of the feed block might extrude polymer C adjacent one edge to provide a relatively thick substrate to which an iridescent film is laminated. Alternately, the single passageway c (or multiplicity of passageways c) might be disposed in the central portion of the distribution block in such a way that the substrate is extruded between two iridescent films. Thus, with simple modifications to the feed block, extrusion of a transparent multilayer film is readily achieved wherein the feed block arrangement of FIG. 3 is employed; or alternately by varying the position and location of the discharge of one of the components being fed to the die, the single-sided iridescent opaque films or sheets are readily produced or double-sided opaque iridescent films can be prepared. The choice of the substrate from which to place the iridescent film is primarily one of the particular applications to which the iridescent film is being placed.

Various additives and stabilizers are beneficially utilized. Pigments, stabilizers, dyes, lubricants and other additives may be present in the polymers. However, if maximum iridescence is desired, such additives should be maintained at a level which does not interfere significantly with the transparency of the product.

EXAMPLE 1

Employing an apparatus generally as illustrated in FIGS. 2-5, a two-component film is prepared by utilizing the feed ports A and B to form a biaxially oriented film having about 125 layers and a final thickness of about 0.9 mil. The transparent thermoplastic resinous polymers are 20 parts polystyrene and 80 parts low density polyethylene. The thickness of the polyethylene layers is about 0.27 micron. The thickness of the polystyrene layers is about 0.08 micron. The resultant film shows increased impact strength, has an ultimate elongation about equal to that of polystyrene alone, an ultimate tensile strength about one third that of polystyrene and about 30 percent greater than polyethylene, and a remarkable resistance to the development of gas and water vapor leaks on crumpling. Embossing of the product issuing from the die prior to cooling below the thermoplastic temperature results in a regular variation of the iridescent character generally following the pattern of the embossing.

In a manner similar to the foregoing illustrations, multilayer fibers and filaments having an iridescent character are readily produced when a filament die plate is substituted for a film or sheeting die. By slitting iridescent multilayer film into narrow strips, filaments are prepared which are readily woven into textile fibers either alone or in combination with other yarns or fibers. Beneficially, such film filaments are twisted or folded to form microtapes and subsequently utilized in textile applications.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the preparation of a composite synthetic resinous sheet-like article comprising in cooperative combination
    means for providing at least two streams of heat plastified thermoplastic resinous material,
    means for mechanically arranging the two streams into a composite stream having a plurality of generally parallel layers wherein a portion of one stream encapsulates the composite stream,
    means for mechanically manipulating the composite stream to provide an increased number of layers in the mainpulated stream, and
    means for shaping the manipulated stream into a desired configuration having a plurality of layers generally parallel to a major surface of the desired configuration.

2. An apparatus for the preparation of a multilayer plastic body comprising in cooperative combination
    a first source of heat plastified thermoplastic resinous material,
    a second source of heat plastified thermoplastic resinous material,
    a combining means for receiving heat plastified material from the first and second sources and arrange the heat plastified materials in layered relationship to form a composite stream encapsulated within material from one of said sources,
    a layer multiplying means in communication with the combining means, the layer multiplying means for physically rearranging the plastified thermoplastic resinous material to provide at least an apparent increase in the number of layers,
    a shaping die in operative communication with the layer multiplying means, the shaping die so constructed and arranged so as to permit substantially streamlined flow and to shape the stream to a desired configuration having generally opposed major surfaces.

3. An apparatus for the generation of thermoplastic resinous bodies having multiple layers comprising in cooperative combination
    a housing, the housing defining at least a first polymer inlet, a second polymer inlet, a first plenum and a second plenum in operative communication with the first and second polymer inlets, respectively,
    a layering chamber in communication with the first and second plenums,
    a feed block disposed within the layering chamber, the feed block defining a plurality of passageways, each of the passageways communicating with one of the plenums and terminating remote from the plenum in a discharge opening, the feed block defining
    a plurality of discharge openings in generally side by side relationship, the feed block being means for providing a layered stream encapsulated within material from one of said polymer inlets,
    a stream shaping housing in communication with the discharge orifices of the feed block, the shaping housing defining an
    internal passageway having a first end and a second end, the first end of the passageway being generally coextensive with the discharge openings of the feed block, the second end being remotely disposed from the feed block, the passageway of the stream shaping housing permitting streamline flow therein, a stream dividing and re-combining means in communication with the second end of the housing, the stream dividing sand re-combining means being for dividing the stream and re-combining it so as to increase the number of layers in the stream, a housing defining a transition section, the housing having defined therein a passageway adapted to receive a layered stream from the layer multiplying means, the transition section having means of expanding the dimension of the stream in a direction generally normal to the longitudinal axis of the opening of the first end of the first transition piece.

4. The apparatus of claim 3 including a sheeting die affixed to the second transition section, the apparatus having means for permitting streamline flow therein without significant rotation of the stream layers.

5. The apparatus of claim 3 including a third polymer inlet and means for combining streams of three diverse thermoplastic resinous materials in an alternating manner.

6. The apparatus of claim 3 wherein the distribution block provides means for alternating layers of diverse polymer.

7. An apparatus adapted to transform streams of diverse thermoplastic resinous material into a layered structure having generally spirally disposed layers, the apparatus comprising a housing, the housing defining at least two generally annular polymer distribution chambers, means for introduction of a heat plastified thermoplastic resinous material into the polymer distribution chambers, a generally annular distribution or feed block means defining a plurality of channels, each of the channels having a discharge orifice, the discharge orifices being generally annularly disposed and in communication with a generally annular passageway defined within the housing, said feed block means arranging the materials so that material from one distribution chamber encapsulates the material from the second distribution chamber within the annular passageway, and the encapsulated material extends toward both inner and outer surfaces of the passageway, each of the channels in the feed block selectively being in communication with the annular polymer distribution chambers, the annular polymer passageway being defined by walls within the housing and at least a portion of the walls of the polymer receiving passage-way being rotatably mounted and having means for rotating said walls relative to each other.

8. The apparatus of claim 7, including means for rotation of said walls simultaneously in opposite directions.

* * * * *